(12) United States Patent
Galante et al.

(10) Patent No.: US 9,740,666 B1
(45) Date of Patent: Aug. 22, 2017

(54) SYSTEMS AND METHODS FOR MERGING TABLE CELLS VIA EXPANSION BASED ON STATES OF CELLS

(71) Applicant: Google Inc., Mountain View, CA (US)

(72) Inventors: Gregory George Galante, Little Silver, NJ (US); Victoria Hsiao-Tsung Chou Fritz, Maplewood, NJ (US); Samuel Benjamin Messing, Brooklyn, NY (US); Luiz Do Amaral De Franca Pereira Filho, Jersey City, NJ (US)

(73) Assignee: GOOGLE INC., Mountain View, CA (US)

( * ) Notice: Subject to any disclaimer, the term of this patent is extended or adjusted under 35 U.S.C. 154(b) by 165 days.

(21) Appl. No.: 14/468,861

(22) Filed: Aug. 26, 2014

(51) Int. Cl.
| | |
|---|---|
| *H03M 5/00* | (2006.01) |
| *H03M 7/00* | (2006.01) |
| *H03M 7/30* | (2006.01) |
| *G06F 17/21* | (2006.01) |
| *G06F 17/30* | (2006.01) |
| *H04L 29/08* | (2006.01) |
| *B24B 41/06* | (2012.01) |
| *G06F 17/24* | (2006.01) |

(52) U.S. Cl.
CPC ........... *G06F 17/212* (2013.01); *B24B 41/06* (2013.01); *G06F 17/30994* (2013.01); *H04L 67/10* (2013.01); *G06F 17/243* (2013.01); *G06F 17/245* (2013.01); *G06F 17/246* (2013.01); *G06F 17/247* (2013.01)

(58) Field of Classification Search
CPC . G06F 7/06; G06F 7/22; G06F 17/212; G06F 17/245; H04L 67/10
USPC .......................................................... 715/227
See application file for complete search history.

(56) References Cited

U.S. PATENT DOCUMENTS

| | | | | |
|---|---|---|---|---|
| 6,442,575 | B2 * | 8/2002 | Pratley | G06F 17/245 715/212 |
| 2001/0049699 | A1 * | 12/2001 | Pratley | G06F 17/245 715/212 |
| 2009/0276692 | A1 * | 11/2009 | Rosner | G06F 17/30498 715/227 |
| 2013/0086461 | A1 * | 4/2013 | Ashley-Rollman | G06F 17/245 715/217 |

OTHER PUBLICATIONS

A Collaborative Table Editing Technique Based on Transparent Adaptation, Authors: Steven Xia, David Sun, Chengzheng Sun, and David Chen, Editors: R. Meersman and Z. Tari: CooplS/DOA/ODBASE 2005, LNCS 3760, pp. 576-592, Year Published: 2005.*

* cited by examiner

*Primary Examiner* — Cesar Paula
*Assistant Examiner* — Luu-Phuong Nguyen
(74) *Attorney, Agent, or Firm* — Lowenstein Sandler LLP

(57) ABSTRACT

Systems and methods are disclosed herein for resolving a change to a table. A processing circuitry receives, from a user in a collaborative document editing environment, the change to the table, wherein the change comprises an expansion of a first cell in the table. A first state of the first cell is identified, wherein the state is indicative of a number of columns and a number of rows over which the first cell spans, and at least one of the number of columns and the number of rows is greater than one. A second state of a second cell that is adjacent to the first cell is identified, and the processing circuitry selects whether to allow the expansion of the first cell based on the second state of the second cell.

18 Claims, 12 Drawing Sheets

| NAME | DEFAULT | VALIDATION | DESCRIPTION |
|---|---|---|---|
| COL_SPAN | 1 | >=1 | DESCRIBES THE NUMBER OF COLUMNS THE CELL MERGES WITH |
| ROW_SPAN | 1 | >=1 | DESCRIBES THE NUMBER OF ROWS THE CELL MERGES WITH |

FIG. 4

| STATE | DESCRIPTION |
|---|---|
| HEAD | WHEN A CELL HAS COL_SPAN AND/OR ROW_SPAN GREATER THAN ONE. THESE CELLS CAN SPAN ANY CELL WITH A VALUE OF (1,1) |
| MERGED | A CELL WITH VALUES (1,1), WHICH HAS A HEAD CELL SPANNING OR MERGING WITH IT. THESE CELLS ARE NOT DISPLAYED AND INSTEAD THE HEAD CELL TAKES UP THEIR AVAILABLE SPACE. |
| NORMAL | A CELL WITH VALUES (1,1) AND NO HEAD CELL HAS SPANNED OR MERGED WITH IT. THESE CELLS DISPLAY NORMALLY. |

SYSTEMS AND METHODS FOR MERGING TABLE CELLS VIA EXPANSION BASED ON STATES OF CELLS

FIELD OF THE INVENTION

In general, this disclosure relates to processing changes to a table in a document.

BACKGROUND

Computing systems are capable of allowing users make edits to a table in a document, such as causing cells in the table to merge. In some existing table editors, such as HTML, cells are not strictly "merged." Instead a cell is allowed to expand to take up more space either vertically or horizontally, and the "merged" cells are simply hidden. In this case, the merged cell and the expanding cell are not associated with each other, which can lead to complications in a controller that represents the table. Moreover, no limits are placed on the amount that the expanding cell can expand, which further complicates the model. In other table editors, such as OOXML, cells expand horizontally and cover up cells vertically. However, OOXML requires that the covering cell is explicitly marked as a covering cell, and that the covered cell is also explicitly marked as a covered cell. This direct dependency between the two covering cell and the covered cell in OOXML can cause problems in real time collaborative models, because a change to any cell in the table can affect any other cell.

SUMMARY

Systems and methods are disclosed herein for resolving a change to a table. A processing circuitry receives, from a user in a collaborative document editing environment, the change to the table, wherein the change comprises an expansion of a first cell in the table. A first state of the first cell is identified, wherein the state is indicative of a number of columns and a number of rows over which the first cell spans, and at least one of the number of columns and the number of rows is greater than one. A second state of a second cell that is adjacent to the first cell is identified, and the processing circuitry selects whether to allow the expansion of the first cell based on the second state of the second cell.

Another aspect relates to a system including means for resolving a change to a table. A receiving means receives from a user in a collaborative document editing environment, the change to the table, wherein the change comprises an expansion of a first cell in the table. An identifying means identifies a first state of the first cell, wherein the state is indicative of a number of columns and a number of rows over which the first cell spans, and at least one of the number of columns and the number of rows is greater than one. The identifying means further identifies a second state of a second cell that is adjacent to the first cell. A selecting means selects whether to allow the expansion of the first cell based on the second state of the second cell.

In some embodiments, the expansion of the first cell is allowed, the second cell is hidden from a display of the table. If the expansion of the first cell is not allowed, the first state of the first cell may be updated to reflect that the number of columns is one, and the number of rows is one. The expansion may be allowed if the second state of the second cell indicates that the second cell spans over one column and one row. The expansion may not be allowed if the second state of the second cell indicates that the second cell spans over more than one column or more than one row. The expansion may not be allowed if the second state of the second cell is hidden from a display of the table before the change is received. The expansion may not be allowed if the expansion would cause the first cell to span over a non-existent cell.

In some embodiments, the change is a first change. At substantially the same time that the first change is received, another user in the collaborative document editing environment may transmit a second change to the processor, and the second change comprises an expansion of a third cell that is adjacent to the second cell. Accepting both the first change and the second change may cause the second cell to have an error state. One of the first change and the second change may be selected so that the second cell does not have the error state.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 4 is an example data structure that defines two cell properties, according to an illustrative embodiment.

FIG. 5 is an example data structure that defines three states for cells, according to an illustrative embodiment.

FIG. 9 shows a set of three collision problem cases, according to an illustrative embodiment.

FIG. 10 shows a set of solutions to three collision problem cases, according to an illustrative embodiment.

DETAILED DESCRIPTION

To provide an overall understanding of the disclosure, certain illustrative embodiments will now be described, including a system for resolving edits to a table. In particular, a device is described that allows for cells in a table to expand and merge over other cells in the table. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The present disclosure provides systems and methods for resolving edits to a table. The methods described herein allow for an efficient way to represent changes to a table. The systems and methods described herein overcome many of the technical difficulties associated with existing document editing applications and are described in terms of a web-based storage system, which may communicate with other systems over a network to store and share user data. In general, one of ordinary skill in the art will understand that the systems and methods described herein are applicable to systems that are locally interconnected without departing from the scope thereof.

Figure 1:
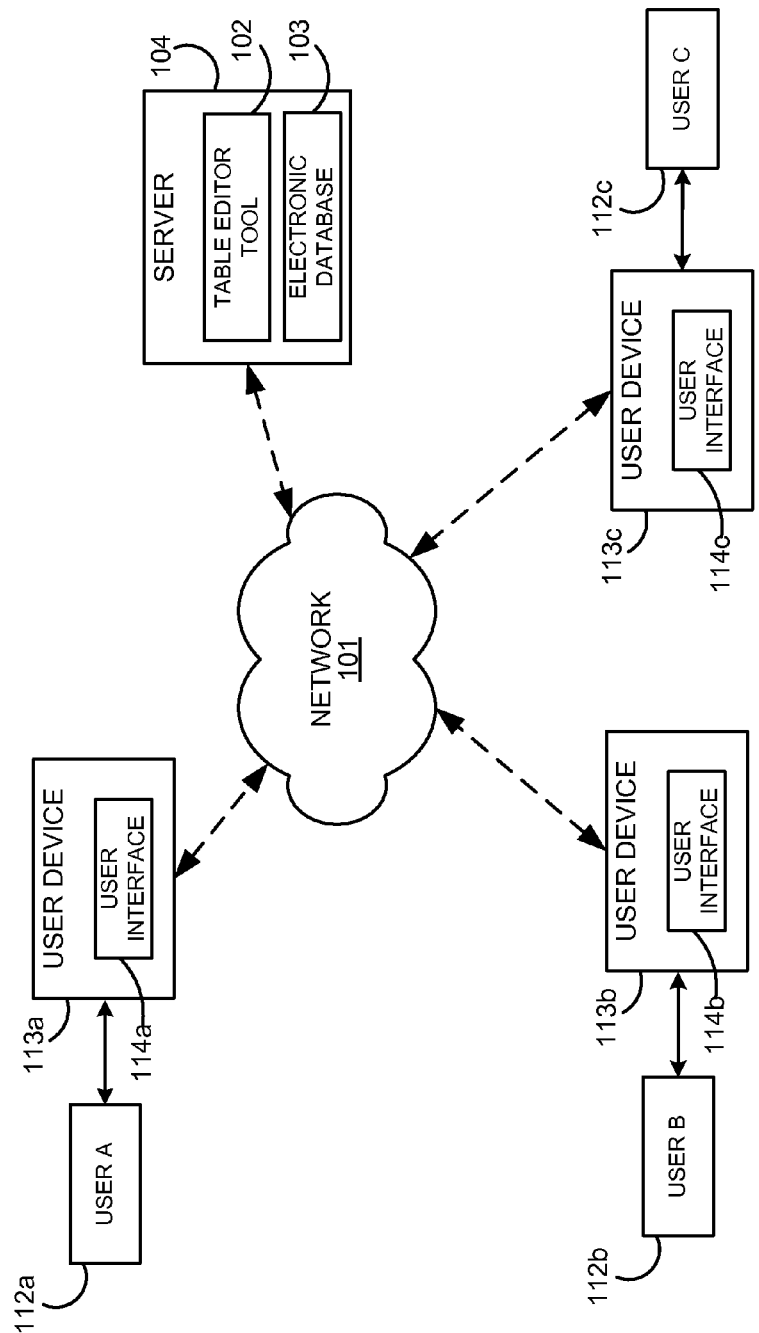
FIG. 1 is a block diagram of a computerized system for integrating collaboratively proposed changes and publishing an electronic document, according to an illustrative embodiment.

FIG. 1 depicts an example of a network and database structure that may be used to implement the systems and methods herein. FIG. 1 is a block diagram of a computerized system 100 for resolving changes to a table. The system 100 includes a server 104 and three user devices 113a-113c (generally, user device 113) connected over a network 101. The server 104 includes a table editor tool 102 and an electronic database 103. The table editor tool 102 manages updates to a document that is stored in the electronic database 103. Each user device 113 includes a user interface 114a-114c (generally, user interface 114), each of which may include a display and a user input device. Users 112a-112c (generally user 112) interact with the user devices 113 over the user interfaces 114 to view documents maintained by the server 104 and provide changes to the documents. Additionally, one or more processors may be in each user device 113, the server 104, and the table editor tool 102. As used herein, the term "processor" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. Only one server 104 and three user devices 113 are shown in FIG. 1 to avoid complicating the drawing. In general, the system 100 can support multiple servers and any number of user devices.

The server 104 may be a web-based storage system that hosts files and allows users to store, retrieve, and modify data. This data may be referred to as a user's web data, which may be stored in a portion of the electronic database 103 that is allocated to each user. The server 104, the table editor tool 102, or both may perform functions related to maintaining the documents that are stored on the electronic database 103. The server 104 may be implemented on a single server system or in a distributed system. In particular, the server 104 may use cloud storage to store user data.

The table editor tool 102 may include a processor and a memory unit that stores instructions readable by the processor to carry out any of the processes described herein. As shown in FIG. 1, the table editor tool 102 is a component on the server 104. However, any of the functions described herein as being implemented by the table editor tool 102 may be performed by any processor on the server 104, by a processor on any of the user devices 113, by a separate processor, or any suitable combination thereof. Moreover, the user devices 113 may include a memory unit that stores instructions readable by one or more processors to carry out the processes described herein.

In an example, a document is stored on the electronic database 103, and the users 112 simultaneously view and edit the document over the user devices 113. In particular, a view of the document is displayed on each of the user interfaces, and the users 112 may make changes to the document. The changes are transmitted over the network 101 to the server 104, which updates the document in the electronic database 103 with the changes, and transmits updated views of the document back to each of the user devices 113. In this manner, the view of the document is updated in real time with the changes that are made by each user.

In order to describe the structure of a table in a document, the present disclosure allows for the ability to convey that a cell is merged across one or more other cells. In a model based on real time collaboration, collaborators may make simultaneous (or near simultaneous) conflicting edits. As used herein, an "edit" refers to a mutation to one or more properties of any number of cells in a table. In one example, a first collaborator may provide a first edit to merge two or more cells, where a first cell is merged over a second cell. In this case, the contents of the second cell are deleted, and only the contents of the first cell remain in the new merged cell. This first edit may be referred to as a "merge edit." At the same (or nearly the same) time, a second collaborator may provide a second edit to the second cell. This arises in a conflict, in which the first collaborator essentially wishes to delete the second cell, while the second collaborator wishes to keep the second cell and make a change to it. In this manner, merging cells in a table in a real-time collaborative document editing environment causes problems because collaborator edits may collide with a merge edit, and/or collaborator edits may cause cells to be deleted or inserted unexpectedly.

Figure 2:
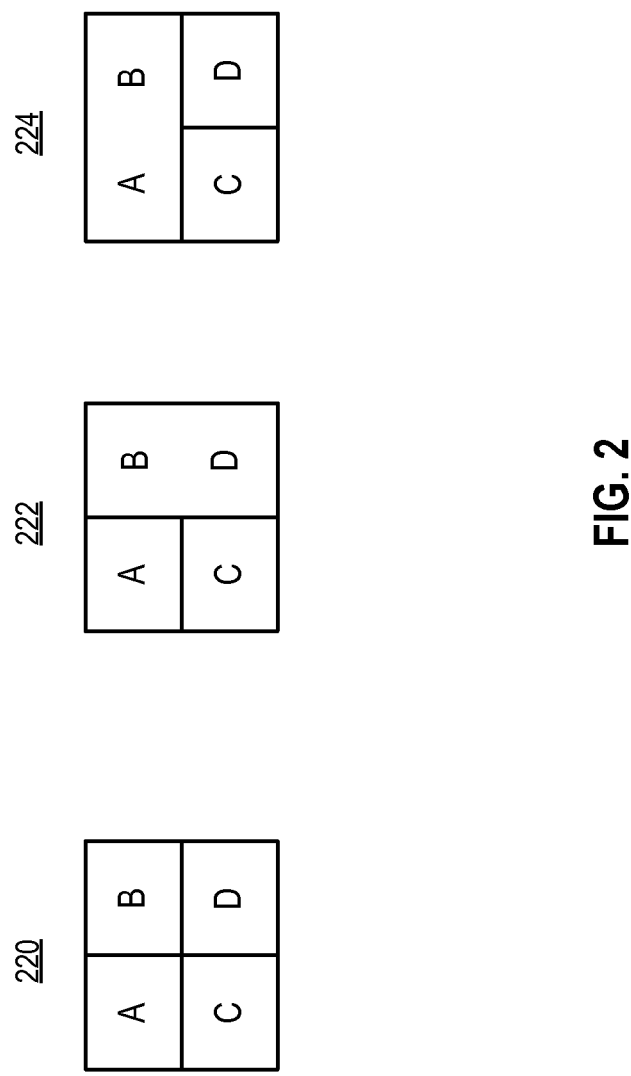
FIGS. 2 and 3 are example diagrams of conflicting changes that are made to a table, according to illustrative embodiments.
Figure 3:
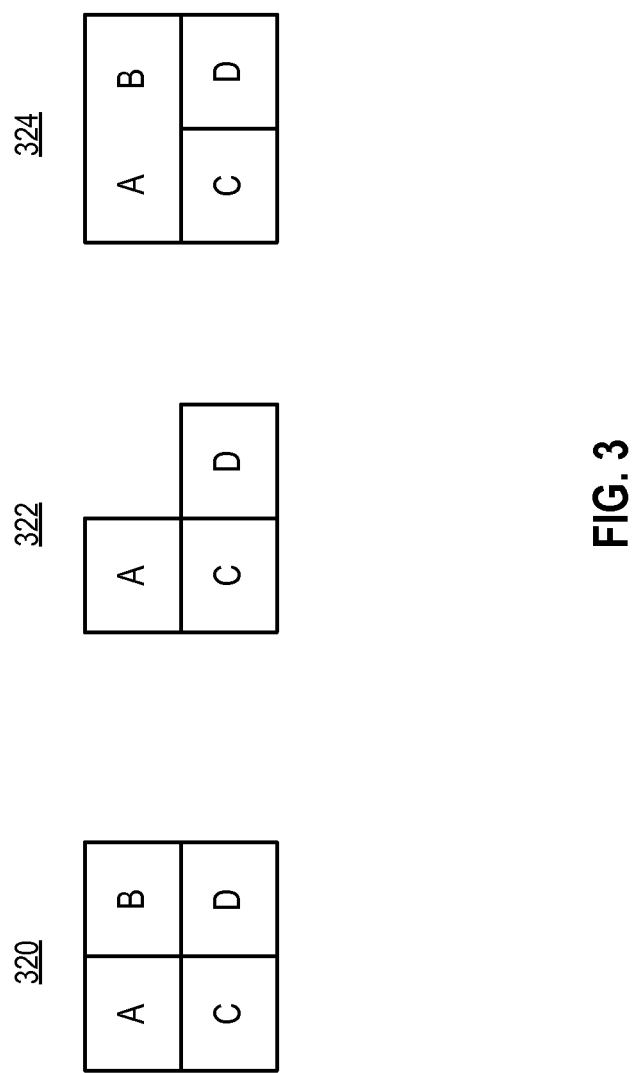

FIGS. 2 and 3 each show three example tables that illustrate edit collisions related to cell merges in tables. In particular, FIG. 2 shows three example tables 220, 222, and 224. The table 220 illustrates a starting condition of a table that includes two rows and two columns, where each cell is labeled A, B, C, or D. The table 222 shows the resulting table after a first collaborator applies a first edit (or mutation) that merges the cells B and D. The table 224 shows the resulting table after a second collaborator applies a second edit that merges cells A and B. When the first and second edits are made substantially simultaneously, it is unclear which of the edits should prevail, if any. FIG. 3 shows another three example tables 320, 322, and 324. The table 320 is the same as the table 220 in FIG. 2, which shows the starting condition of the table. The table 322 shows the resulting table after a first collaborator applies a first edit to remove the cell B. The table 324 is the same as the table 224 in FIG. 2, which shows the resulting table after a second collaborator applies a second edit that merges cells A and B. Again, when the first and second edits are made substantially simultaneously, it is unclear which of the edits should prevail, if any. The systems and methods of the present disclosure define a way to efficiently determine how to select a winning edit to enhance the user experience in a collaborative document editing environment.

FIG. 4 depicts an example data structure 400 that defines two properties of cells in a table. The two properties shown in FIG. 4 are COL_SPAN and ROW_SPAN and define the number of columns (for COL_SPAN) or rows (for ROW_SPAN) over which each cell spans. As used herein, the notation (A, B) will be used to denote a cell with properties COL_SPAN equal to A and ROW_SPAN equal to B, such that the cell merges with A columns and B rows. For example, a (1, 1) cell denotes a cell that only takes up one column and one row, and does not span or merge with any other cell. As another example, a (2, 1) cell denotes a cell that takes up two columns and one row, such that the cell is merged with an adjacent cell to the right. As another example, a (1, 2) cell denotes a cell that takes up one column and two rows, such that the cell is merged with an adjacent cell to the bottom.

FIG. 5 depicts an example data structure 500 that defines three states for cells in a table. Each cell may be assigned to one of the three states, which are shown in FIG. 5 as a head state, a merged state, and a normal state. A cell has a head state when the cell has a COL_SPAN value greater than one, a ROW_SPAN value greater than one, or both. Head cells may span over (i.e., merge with) any cell that has COL_SPAN and ROW_SPAN properties (1, 1). A cell is in a merged state when the cell has COL_SPAN and ROW_S-PAN properties (1, 1) and when a head cell spans over the cell (i.e., merges with the cell). Cells in the merged state are not displayed, and the head cell that spans over merged cells take over the space allotted to the merged cells. A cell is in a normal state when the cell has COL_SPAN and ROW_S-PAN properties (1, 1) and when no head cell spans over the cell. Cells in the normal state are displayed. In some embodiments, the cell states are stored on a cache on the user device 113, such that the user device 113 may determine the states of each cell in a table.

Figure 6:
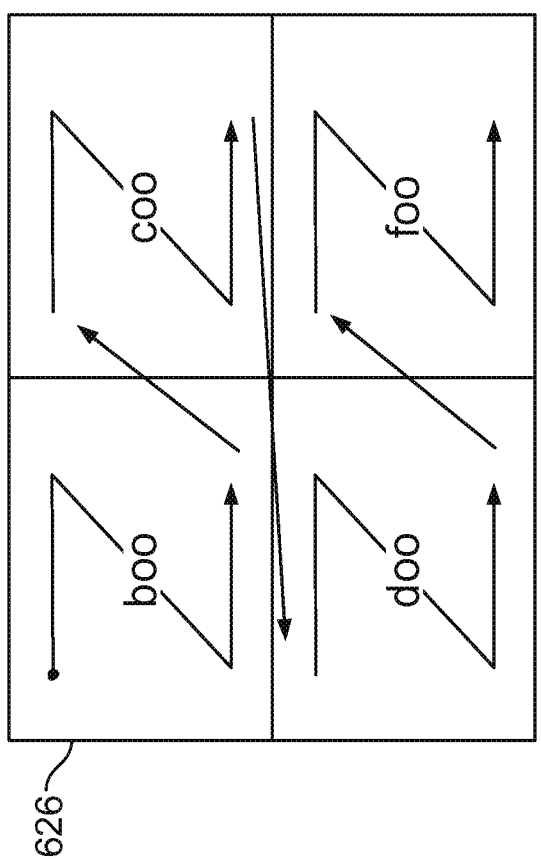
FIG. 6 shows an example diagram for visualizing a layout process for a table, according to an illustrative embodiment.

FIG. 6 depicts a model for laying out a display of cells in a table. In particular, the diagram 626 defines an order in which to lay the cells and cell content in the table. The diagram 626 depicts the directions in which the model may parse a table from left to right, and then from top to bottom. A model may be used to represent a table, in accordance with the present disclosure. In an example, a character-based model may be used to define a way to represent a layout of cells in a table using a set of characters in a string.

The present disclosure allows for an efficient implementation of laying out a table that includes cells. This implementation includes the use of one or more rules that define how to lay out the table. A first rule requires that head cells are always expanded from left to right, and then top to bottom. A second rule requires that the COL_SPAN is respected and expanded before the ROW_SPAN is expanded. A third rule requires that a cell that has COL_SPAN greater than one expands until the cell merges with a number of cells corresponding to the COL_SPAN value (minus one), or until one or more of three conditions is met. These three conditions may correspond to (1) the end of a row is reached, (2) a previously merged cell is reached, and (3) a head cell is reached. A fourth rule requires that a cell with a ROW_SPAN value greater than one expands until the cell merges with a number of cells corresponding to the ROW_SPAN value (minus one), or until one or more of four conditions is met. These four conditions may correspond to (1) a missing cell is reached, (2) the bottom of the table is reached, (3) a previously merged cell is reached, and (4) a head cell is reached.

As described herein, this set of four rules may be used to simplify the description of how to lay out a table. One advantage of using these rules is that no special considerations need to be applied for operational transforms. However, any property of a cell or table may be changed at any time, potentially leading to cases in which conflicting changes may be made at the same time. The rules described herein provide an efficient way to resolve conflicting changes, which are described in relation to FIGS. 7-10.

Figure 7:
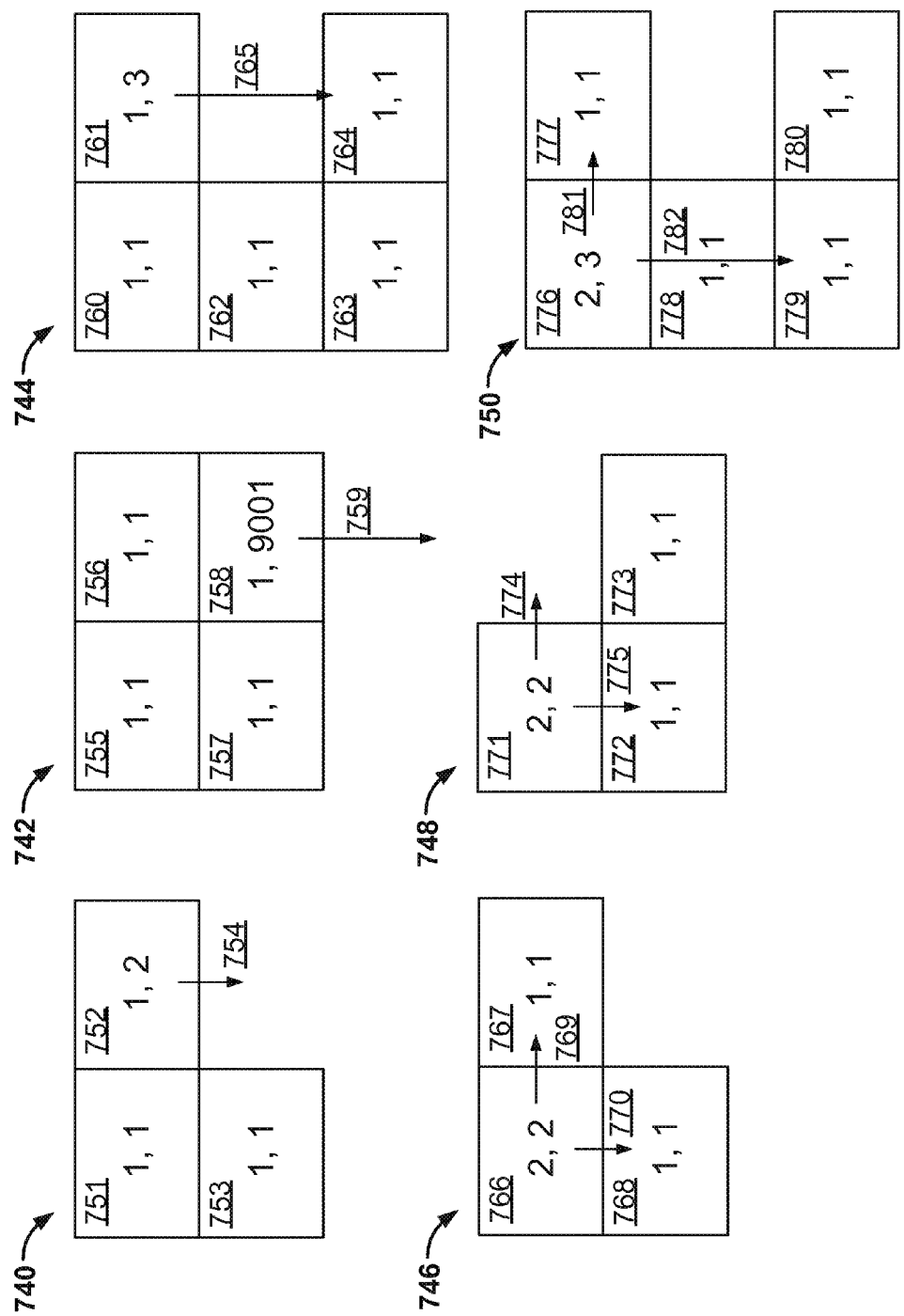
FIG. 7 shows a set of six degenerate problem cases, according to an illustrative embodiment.
Figure 8:
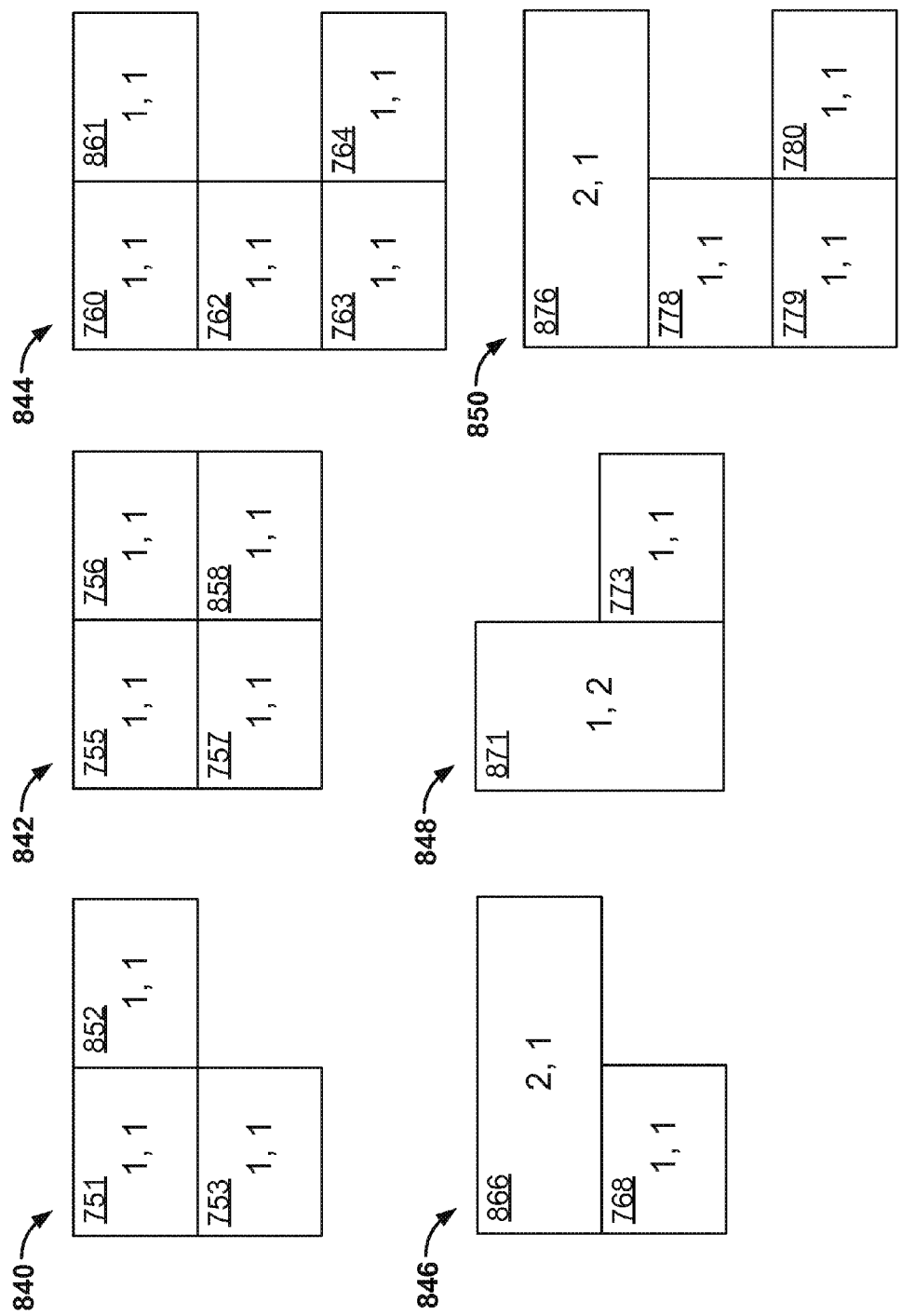
FIG. 8 shows a set of solutions to six degenerate problem cases, according to an illustrative embodiment.
Figures 9, 10:
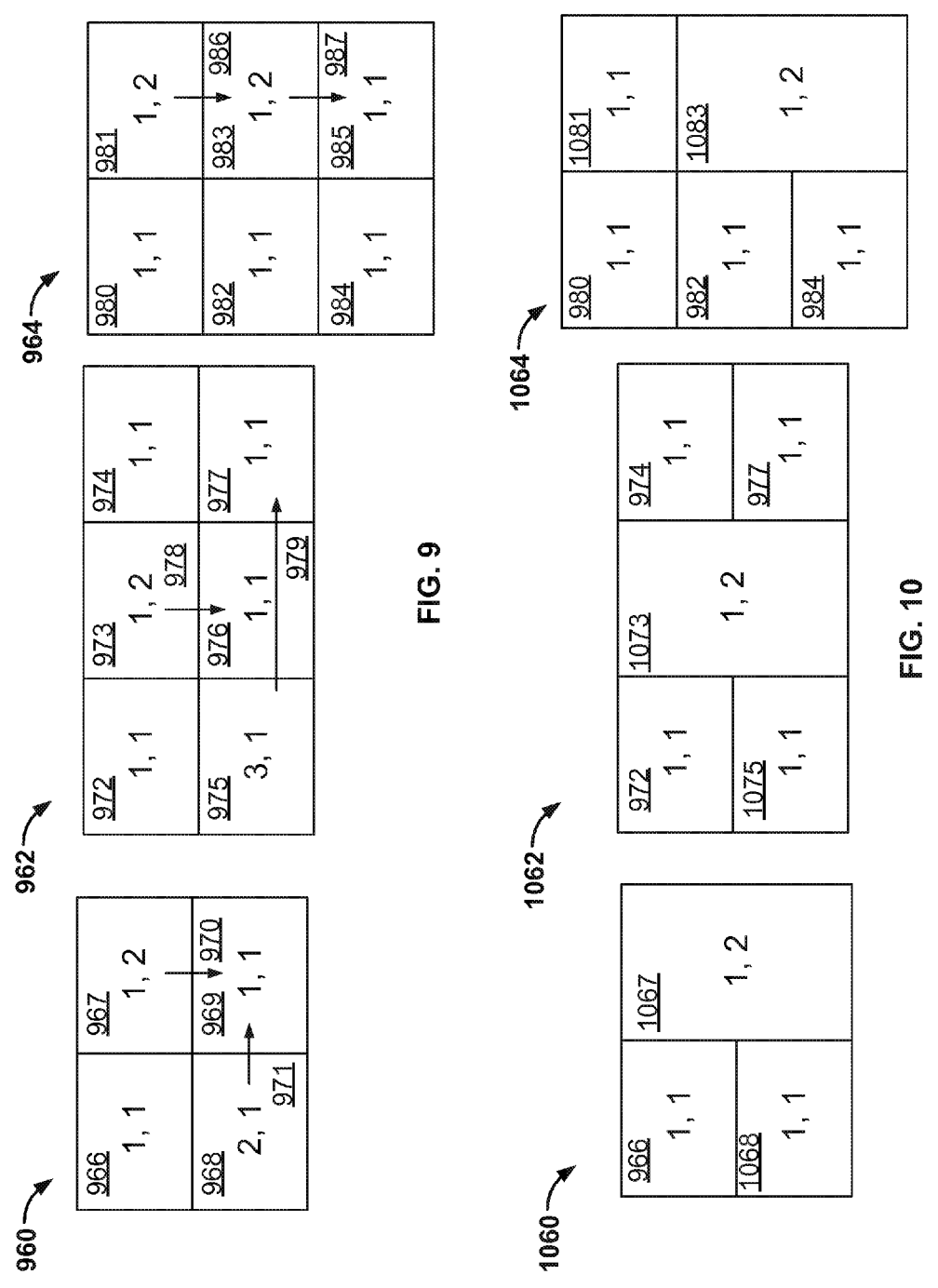

FIGS. 7-10 show a set of example problem cases and solutions to the example problem cases, according to embodiments of the present disclosure. Degenerate cases are shown in FIGS. 7 and 8, in which changes made by users indicate a desire to merge an existing cell with a non-cell, or a hole, in a table that is not shaped rectangularly. Collision cases are shown in FIGS. 9 and 10, in which one user provides a change to a table that conflicts with another change that is made at (or nearly at) the same time. In each of the diagrams shown in FIGS. 7-10, cells are shown as rectangles, and the pair of numbers shown in each cell corresponds to values for (COL_SPAN, ROW_SPAN). Furthermore, the arrows in the problem cases shown in FIGS. 7 and 9 correspond to expansions. These expansions may be requested by a user who wishes to merge the cell at the origin of the arrow with one or more cells in the direction of the arrow.

FIG. 7 shows a set of six degenerate problem cases 740, 742, 744, 746, 748, and 750, and FIG. 8 shows a set of solutions 840, 842, 844, 846, 848, and 850 to the six degenerate problem cases shown in FIG. 7. In a first degenerate problem case 740, each of cells 751 and 753 has (COL_SPAN, ROW_SPAN) properties of (1, 1), meaning that these cells each take up one column and one row. Since no other cells are merged over these cells, the cells 751 and 753 are normal cells. The cell 752 has (COL_SPAN, ROW_SPAN) properties of (1, 2), and the arrow 754 indicates that a user wishes to expand the cell 752 downward into a nonexistent cell, or a hole. The corresponding solution 840 indicates that the cell 752 is converted to a normal cell 852 because a merging operation with a hole is not allowed.

In a second degenerate problem case 742, each of cells 755, 756, and 757 has (COL_SPAN, ROW_SPAN) properties of (1, 1), meaning that these cells each take up one column and one row. Since no other cells are merged over these cells, the cells 755, 756, and 757 are normal cells. The cell 758 has (COL_SPAN, ROW_SPAN) properties of (1, 9001), and the arrow 759 indicates that a user wishes to expand the cell 758 downward into a nonexistent cell, or a hole. The corresponding solution 842 indicates that the cell 758 is converted to a normal cell 858 because a merging operation with a hole is not allowed.

In a third degenerate problem case 744, each of cells 760, 762, 763, and 764 has (COL_SPAN, ROW_SPAN) properties of (1, 1), meaning that these cells each take up one column and one row. Since no other cells are merged over the cells 760, 762 and 763, these cells are normal cells. The cell 761 has (COL_SPAN, ROW_SPAN) properties of (1, 3), and the arrow 765 indicates that a user wishes to expand the cell 761 downward through a nonexistent cell (or a hole) into the cell 764. The corresponding solution 844 indicates that the cell 761 is converted to a normal cell 861 because a merging operation with a hole is not allowed, even if the destination of the arrow 765 was into an existing cell 764.

In a fourth degenerate problem case 746, each of cells 767 and 768 has (COL_SPAN, ROW_SPAN) properties of (1, 1), meaning that these cells each take up one column and one row. Since no other cells are yet merged over these cells, the cells 767 and 768 are normal cells. The cell 766 has (COL_SPAN, ROW_SPAN) properties of (2, 2), and the arrows 769 and 770 indicate a user wishes to expand the cell 766 to the right and downward. The corresponding solution 846 indicates that the cell 766 is converted to a head cell 866 with properties (2, 1), the cell 767 is converted to a merged cell (which is not displayed) because the head cell 866 has spanned over it, and the normal cell 768 remains unchanged. In this example, the head cell 866 does not span over the normal cell 768 because doing so would result in a merge operation with a hole below the cell 767. Moreover, the problem case 746 illustrates that column expansion operations may be performed or attempted before row expansion operations. Alternatively, row expansion operations may be performed or attempted before column expansion operations, without departing from the scope of the present disclosure.

In a fifth degenerate problem case 748, each of cells 772 and 773 has (COL_SPAN, ROW_SPAN) properties of (1, 1), meaning that these cells each take up one column and one row. Since no other cells are yet merged over these cells, the cells 772 and 773 are normal cells. The cell 771 has (COL_SPAN, ROW_SPAN) properties of (2, 2), and the arrows 774 and 775 indicate a user wishes to expand the cell 771 to the right and downward. The corresponding solution 871 indicates that the cell 771 is converted to a head cell 871 with properties (1, 2), the cell 772 is converted to a merged cell (which is not displayed) because the head cell 871 has spanned over it, and the normal cell 773 remains unchanged. In this example, the column expansion indicated by the arrow 774 may be attempted first, but denied because such an operation includes merging with a hole. Then, the row expansion indicated by the arrow 775 is attempted and accepted because the normal cell 772 was present. The head cell 871 does not span over the normal cell 773 because the column expansion was denied.

In a sixth degenerate problem case 750, each of cells 777, 778, 779, and 780 has (COL_SPAN, ROW_SPAN) properties of (1, 1), meaning that these cells each take up one column and one row. Since no other cells are yet merged over these cells, the cells 777, 778, 779, and 780 are normal cells. The cell 776 has (COL_SPAN, ROW_SPAN) properties of (2, 3), and the arrows 781 and 782 indicate a user wishes to expand the cell 776 to the right and downward. The corresponding solution 850 indicates that the cell 776 is converted to a head cell 876 with properties (2, 1), the cell 777 is converted to a merged cell (which is not displayed) because the head cell 876 has spanned over it, and the rest of the normal cells 778, 779, and 780 remain unchanged. In this example, the head cell 876 does not span over the normal cell 778 because doing so would result in a merge operation with a hole below the cell 777.

The example degenerate problem cases and solutions shown in FIGS. 7 and 8 are described by way of illustrative example only, and one of ordinary skill in the art will understand that any degenerate situation in which a requested merge operation for cells in a non-rectangular table may be efficiently resolved using the systems and methods of the present disclosure.

FIG. 9 shows a set of three collision problem cases 960, 962, and 964, and FIG. 10 shows a set of solutions 1060, 1062, and 1064 to the three collision problem cases shown in FIG. 9. In a first collision problem case 960, each of cells 966 and 969 has (COL_SPAN, ROW_SPAN) properties of (1, 1), meaning that these cells each take up one column and one row. Since no other cells are yet merged over these cells, the cells 967 and 968 are normal cells. The cell 967 has (COL_SPAN, ROW_SPAN) properties of (1, 2), and the arrow 970 indicates that a first user wishes to expand the cell 967 downward into the normal cell 969. The cell 968 has (COL_SPAN, ROW_SPAN) properties of (2, 1), and the arrow 971 indicates that a second user wishes to expand the cell 968 rightward into the normal cell 969. The first and second users make the requested expansions corresponding to arrows 970 and 971 at nearly the same time, and the changes are conflicting because both operations would result in different head cells merging over the same cell 969. Since the model parses cells in a table from left to right, and then top to bottom (though the same model may be performed in another other defined direction without departing from the scope of the present disclosure, such as from right to left, and then top to bottom, or bottom to top, and then left to right, for example), the corresponding solution 1060 indicates that the change corresponding to the arrow 970 is implemented before the change corresponding to the arrow 971. In this case, the cell 967 is converted to a head cell 1067, and the normal cell 969 is converted to a merged cell that is not displayed. Moreover, because the cell 968 cannot merge with a cell that is already merged, the cell 968 is converted to a normal cell 1068 with properties (1, 1).

In a second collision problem case 962, each of cells 972, 974, 976, and 977 has (COL_SPAN, ROW_SPAN) properties of (1, 1), meaning that these cells each take up one column and one row. Since no other cells are yet merged over these cells, these cells are normal cells. The cell 973 has (COL_SPAN, ROW_SPAN) properties of (1, 2), and the arrow 978 indicates that a first user wishes to expand the cell 973 downward into the normal cell 976. The cell 975 has (COL_SPAN, ROW_SPAN) properties of (3, 1), and the arrow 979 indicates that a second user wishes to expand the cell 975 rightward into the normal cells 976 and 977. The first and second users make the requested expansions corresponding to arrows 978 and 979 at nearly the same time, and the changes are conflicting because both operations would result in different head cells merging over the same cell 976. Since the model parses cells in a table from left to right, and then top to bottom, the corresponding solution 1062 indicates that the change corresponding to the arrow 978 is implemented before the change corresponding to the arrow 979. In this case, the cell 973 is converted to a head cell 1073, and the normal cell 976 is converted to a merged cell that is not displayed. Moreover, because the cell 975 cannot merge with a cell that is already merged, the cell 975 is converted to a normal cell 1075 with properties (1, 1).

In a third collision problem case 964, each of cells 980, 982, and 984 has (COL_SPAN, ROW_SPAN) properties of (1, 1), meaning that these cells each take up one column and one row. Since no other cells are merged over these cells, these cells are normal cells. The cell 981 has (COL_SPAN, ROW_SPAN) properties of (1, 2), and the arrow 986 indicates that a first user wishes to expand the cell 981 downward into the cell 983. At nearly the same time, a second user wishes to expand the cell 983 downward into the cell 985, with a change that is indicated by the arrow 987. The changes made by the first and second users are conflicting because both operations would result in different states for the cell 983. In particular, the change indicated by the arrow 986 would cause the cell 983 to be converted to a merged cell that is not displayed, while the change indicated by the arrow 987 would cause the cell 983 to be a head cell that merges with the cell 985. Since the model allows expansion operations to occur until a head cell is reached, the corresponding solution 1064 indicates that the change corresponding to the arrow 987 is implemented, and the change corresponding to the arrow 986 is rejected. In particular, when the change corresponding to the arrow 986 is attempted to be implemented, the model recognizes that an expansion with a head cell 983 is being attempted, and denies the change. In this case, the cell 983 is a head cell 1083, the normal cell 985 is converted to a merged cell that is not displayed in the solution 1064, and the previous head cell 981 is converted to a normal cell 1081.

Figure 11:
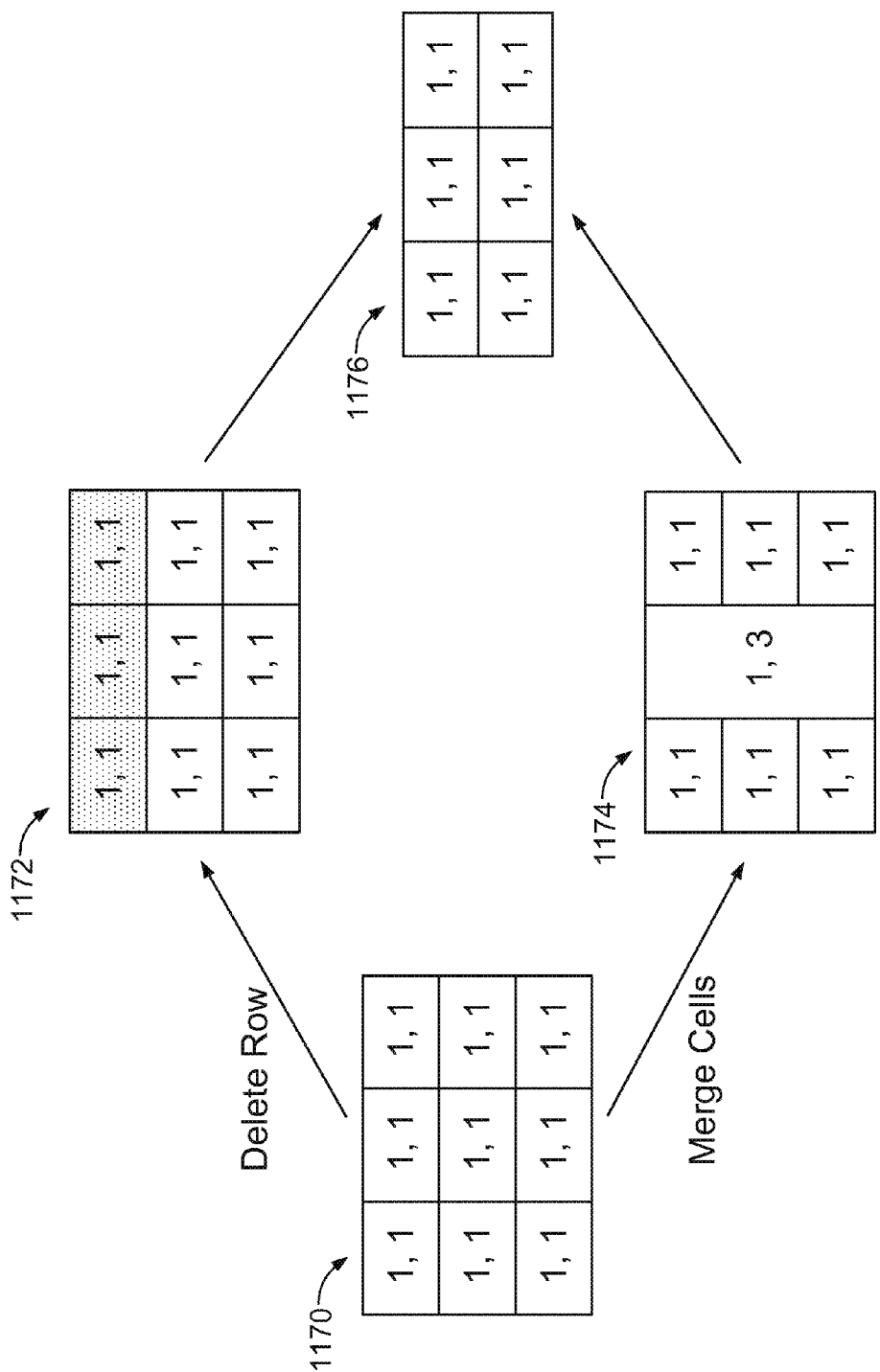
FIG. 11 is a diagram of an example change to a table when a head cell is deleted, according to an illustrative embodiment.

FIG. 11 is a diagram of an example change to a table when a row of a table is deleted, according to an illustrative embodiment. The original table 1170 includes nine normal cells arranged in a three by three table. A first user provides a first operation including a request to delete the top row, as shown in the top table 1172. At the same time (or nearly the same time), a second user provides a second operation including a request to merge the three cells in the middle column, as shown in the bottom table 1174. These first and second operations are conflicting operations because they result in different changes to the top cell of the middle column. In particular, the cell would be deleted in accordance with the top table 1172, but would be merged with the lower two cells in accordance with the bottom table 1174. Because the model described herein parses a table from left to right, and then top to bottom, the first operation is implemented, and the second operation is rejected, as is shown in the solution table 1176. In particular, the deletion of the top row is observed first because such an operation affects the top left cell of the table 1170, while the first cell that is affected by the second operation is the top middle cell of the table 1170.

Figure 12:
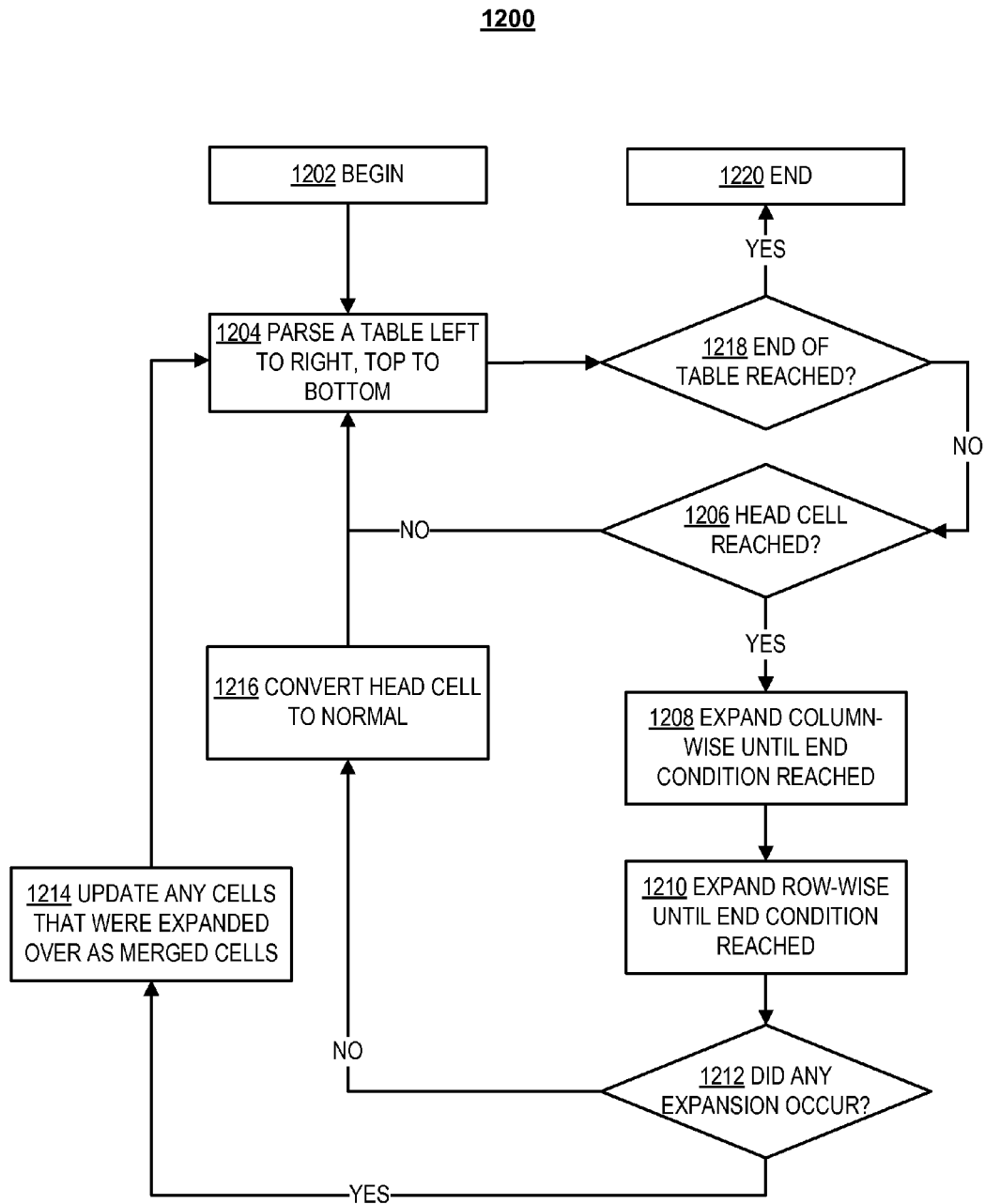
FIG. 12 is a detailed flowchart of a method used by a table editor tool, according to an illustrative embodiment.

FIG. 12 is a flowchart of a method 1200 used by the table editor tool 102, according to an illustrative embodiment. The method 1200 includes the steps of parsing a table from the left to right, and top to bottom (step 1204), determining whether a head cell is reached (decision block 1206), expanding a head cell column-wise until an end condition is reached (step 1208), and expanding a head cell row-wise until an end condition is reached (step 1210). Then, it is determined whether any expansion occurred (decision block 1212), and if so, any cells that were expanded over are updated as merged cells (step 1214). Otherwise, the head cell is converted to a normal cell (step 1216). These steps are repeated until the end of the table is reached (decision block 1218), and the method 1200 ends (step 1220).

At step 1202, the table editor tool 102 determines to begin the method 1200. In one example, the table editor tool 102 may select to begin the method 1200 whenever a change to a table is received from a user. At step 1204, the table editor tool parses the table from left to right, and then top to bottom, such as is shown in the diagram 626 shown in FIG. 6. As described herein, the model operates in accordance with these directions from left to right, and then top to bottom, by way of illustrative example only. One of ordinary skill in the art will understand that any suitable set of defined directions may be used, such as right to left or bottom to top in any order, without departing from the scope of the present disclosure.

At decision block 1218, the table editor tool 102 determines whether the end of the table is reached. In the example shown in FIG. 12, the end of the table is reached when the table editor tool 102 reaches the bottom right corner of the table. If the end of the table is reached, no further changes need to be made, and the method 1200 ends at step 1220. Otherwise, the method 1200 proceeds to decision block 1206 to determine whether a head cell is reached. If not, the table editor tool 102 proceeds to step 1204 to continue parsing the table until the end of the table is reached, or until a head cell is reached.

When a head cell is reached, the method 1200 proceeds to steps 1208 and 1210 to expand the head cell column-wise until an end condition is reached (step 1208) and to expand the head cell row-wise until an end condition is reached (step 1210). In particular, a head cell is denoted as a cell that has a COL_SPAN value greater than one, a ROW_SPAN value greater than one, or both. When such a cell is reached, the cell is expanded column-wise before being expanded row-wise in step 1210. In another example, the cell may be expanded row-wise before being expanded column-wise, without departing from the scope herein. An end condition is satisfied for step 1208 when any of the following occur during the column expansion: (1) an end of a row is reached, (2) a previously merged cell is reached, and (3) another head cell is reached. Similarly, an end condition is satisfied for step 1210 when any of the following occur during the row expansion: (1) a hole (or a missing cell) is reached, (2) the bottom of the table is reached, (3) a previously merged cell is reached, and (4) another head cell is reached.

At decision block 1212, the table cell editor 102 determines whether any expansions occurred at steps 1208 and 1210 for the current head cell identified at decision block 1206. If so, any cells that were expanded over during the column expansion at step 1208 and the row expansion at step 1210 are updated as merged cells at step 1214. For example, the cell 767 in FIG. 7 was expanded over by the head cell 766, such that the cell 766 is updated to a merged state, and is not displayed in the solution shown in FIG. 8. Similarly, the cells 772 and 777 in FIG. 7 and the cells 969, 976, and 985 in FIG. 9 are each updated from a normal state to a merged state.

Otherwise, if no expansions occurred at steps 1208 or 1210, the head cell is converted to a normal cell at step 1216. For example, the head cell 758 shown in FIG. 7 is unable to be expanded downward, such that the state of the head cell 758 is converted to a normal cell 858 in FIG. 8. Similarly, the cell 761 in FIG. 7 and the cells 968, 975, and 981 are each updated from a head state to a normal state.

Figure 13:
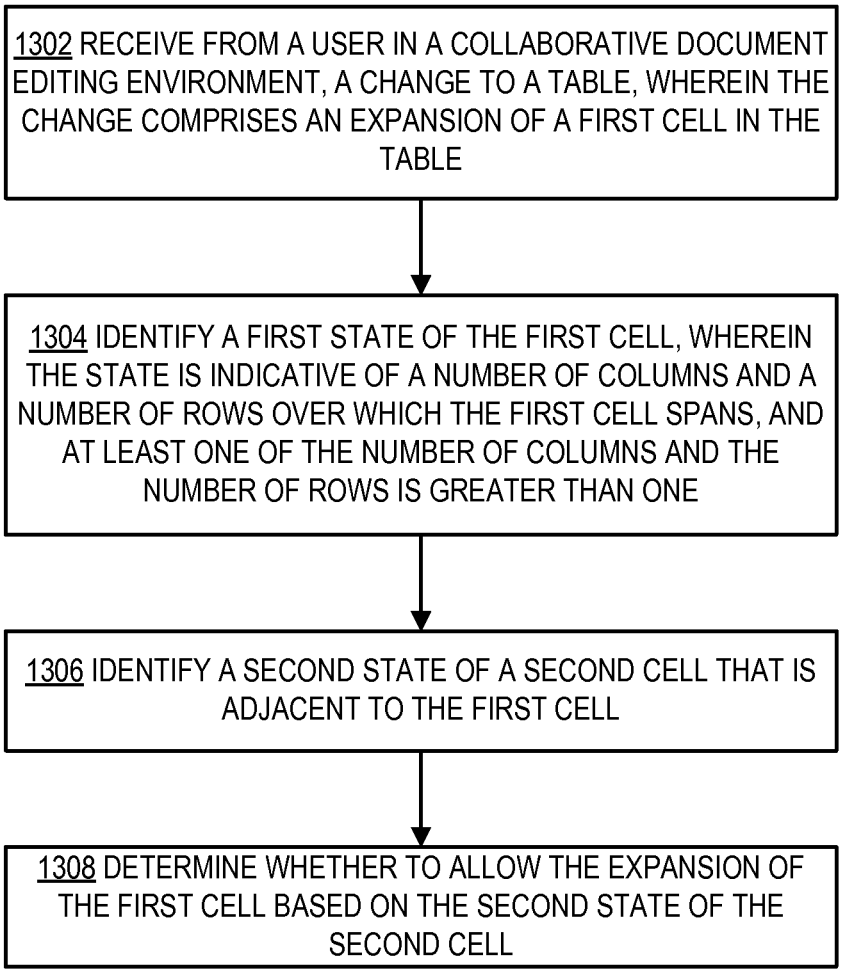
FIG. 13 is a high level flowchart of a method used by a table editor tool, according to an illustrative embodiment.

FIG. 13 is a flowchart of a method used by the table editor tool 102, according to an illustrative embodiment. The method 1300 includes the steps of receiving, from a user in a collaborative document editing environment, the change to the table, wherein the change comprises an expansion of a first cell in the table (step 1302), identifying a first state of the first cell, wherein the state is indicative of a number of columns and a number of rows over which the first cell spans (step 1304), identifying a second state of a second cell that is adjacent to the first cell (step 1306), and determining whether to allow the expansion of the first cell based on the second state of the second cell (step 1308).

At step 1302, the table editor tool 102 receives, from a user in a collaborative document editing environment, the change to the table. The change comprises an expansion of a first cell in the table, such as any of the changes indicated by the arrows in FIGS. 7 and 9. For illustrative purposes, an example case will now be described in relation to the problem case 960 shown in FIG. 9. In this example, the change corresponds to the modification indicated by the arrow 970, which is indicative of a user's request to expand the cell 967 downward.

At step 1304, a first state of the first cell is identified, wherein the state is indicative of a number of columns and a number of rows over which the first cell spans. In an example, the state of the first cell is selected from a set of three possible states: head, merged, and normal. As was described in relation to FIG. 5, a head cell has a COL_SPAN value greater than one, a ROW_SPAN value greater than one, or both. Head cells may span over (i.e., merge with) any cell that has COL_SPAN and ROW_SPAN properties (1, 1). Merged cells have COL_SPAN and ROW_SPAN properties (1, 1) and are spanned over by a head cell (i.e., is merged with a head cell). Cells in the merged state are not displayed, and the head cell that spans over merged cells take over the space allotted to the merged cells. Normal cells have COL_SPAN and ROW_SPAN properties (1, 1) and do not have any head cell that spans over it. Cells in the normal state are displayed. In the example problem case shown in FIG. 9, the first cell is the cell 967, and the first state corresponds to a head state with COL_SPAN and ROW_SPAN properties (1, 2).

At step 1306, a second state of a second cell that is adjacent to the first cell is identified. In the example problem case 960, the cell 969 is the second cell, which is initially in a normal state, and has COL_SPAN and ROW_SPAN properties (1, 1). At step 1308, the table editor tool 102 determines whether to allow the expansion of the first cell based on the second state of the second cell. In the example problem case 960, the second cell is a normal cell and not a merged cell or a head cell. Because the second cell is a normal cell, the table editor tool 102 selects to allow the expansion of the cell 967, as is shown in the solution 1060 in FIG. 10. If the state of the second cell was a head state or a merged state, then the table editor tool 102 may select to deny the expansion of the first cell.

When the expansion of the first cell (i.e., the cell 967) is allowed, the second cell (i.e., the cell 969) is converted to a merged state and is hidden from a display of the table, such as is shown in the solution 1060 of FIG. 10. Alternatively, the expansion of the first cell may not be allowed if the state of the second cell is a head state (such as the cell 984 in FIG. 9) or a merged state (such as the cell 969 in FIG. 9, with respect to the change 971). In this case, the state of the first cell is updated to a normal state to reflect that the number of columns is one, and the number of rows is one (such as the cells 1068, 1075, and 1081 in FIG. 10). Moreover, the expansion of the first cell may not be allowed if the second state of the second cell is merged, such that the second cell is hidden from a display of the table before the change is received. Furthermore, in degenerate cases such as those shown in FIGS. 7 and 8, the expansion may not be allowed if the expansion would cause the first cell to span over a non-existent cell or a hole.

In some embodiments, the decision of whether to allow the expansion of a cell or not is dependent on another change that is received from a different user. For example, the change received at step 1302 may be a first change from a first user in the collaborative document editing environment. At or near the same time, a second change may be received from a second user in the collaborative document editing environment. The second change may include an expansion of a third cell that is adjacent to the second cell, and the second change may involve an expansion of the third cell into the second cell. In this scenario, accepting both the first change and the second change may cause the second cell to have an error state, because accepting the first change would cause the second cell to be merged with the first cell and accepting the second change would cause the second cell to be merged with the third cell. For example, the problem cases 960 and 962 in FIG. 9 illustrate this effect. When the first, second, and third cells take up a non-rectangular space, accepting both changes would cause a conflict for the cells 969 and 976, which may give rise to an error state for these cells. To avoid the error state, one of the first change and the second change is selected to be accepted, while the other change is rejected.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A method for resolving a change to a table, the method comprising:
   receiving, by a processor from a user in a collaborative document editing environment, the change to the table, wherein the change comprises an expansion of a first cell in the table;
   parsing each cell in the table;
   determining a first number of columns and a second number of rows over which the first cell spans, wherein the first number of columns and the second number of rows is greater than a predetermined threshold;
   identifying a first state of the first cell, wherein the first state is identified based on the determined first number of columns and the second number of rows, and wherein the first state of the first cell is further indicative of whether the first cell has merged with another cell;
   determining a third number of columns and a fourth number of rows over which a second cell spans, wherein the third number of columns and the fourth number of rows is greater than the predetermined threshold;
   identifying a second state of the second cell that is adjacent to the first cell, wherein the second state is indicative of whether the second cell has merged with another cell; and
   determining, based on the second state of the second cell whether the first cell has reached an end condition in order to determine whether to allow the expansion of the first cell, wherein the end condition at least comprises the dimensions of the table, and wherein:
      if the expansion of the first cell is allowed, the first state of the first cell is updated to reflect that at least one of the first number of columns and the second number of rows is greater than one, and
      if the expansion of the first cell is not allowed, the first state of the first cell is updated to reflect that the first number of columns and the second number of rows is one.

2. The method of claim 1, wherein if the expansion of the first cell is allowed, the second cell is hidden from a display of the table.

3. The method of claim 1, wherein the expansion is allowed if the second state of the second cell indicates that the second cell spans over one column and one row.

4. The method of claim 1, wherein the expansion is not allowed if the second state of the second cell indicates that the second cell spans over more than one column or more than one row.

5. The method of claim 1, wherein the expansion is not allowed if the second state of the second cell is hidden from a display of the table before the change is received.

6. The method of claim 1, wherein the expansion is not allowed if the expansion would cause the first cell to span over a non-existent cell.

7. The method of claim 1, wherein:
   the change is a first change;
   at substantially the same time that the first change is received by the processor, another user in the collaborative document editing environment transmits a second change to the processor; and the second change comprises an expansion of a third cell that is adjacent to the second cell.

8. The method of claim 7, wherein accepting both the first change and the second change causes the second cell to have an error state.

9. The method of claim 8, further comprising selecting one of the first change and the second change so that the second cell does not have the error state.

10. A system for resolving a change to a table, the system comprising processing circuitry configured to:
   receive from a user in a collaborative document editing environment, the change to the table, wherein the change comprises an expansion of a first cell in the table;
   parsing each cell in the table;
   determine a first number of columns and a second number of rows over which the first cell spans, wherein the first number of columns and the second number of rows is greater than a predetermined threshold;
   identify a first state of the first cell, wherein the first state is identified based on the determined first number of columns and the second number of rows, and wherein the first state of the first cell is further indicative of whether the first cell has merged with another cell;
   determine a third number of columns and a fourth number of rows over which a second cell spans, wherein the third number of columns and the fourth number of rows is greater than the predetermined threshold;
   identify a second state of the second cell that is adjacent to the first cell, wherein the second state is indicative of whether the second cell has merged with another cell; and
   select, based on the second state of the second cell whether the first cell has reached an end condition in order to determine whether to allow the expansion of the first cell, wherein the end condition at least comprises the dimensions of the table, and wherein:
   if the expansion of the first cell is allowed, the first state of the first cell is updated to reflect that at least one of the first number of columns and the second number of rows is greater than one, and
   if the expansion of the first cell is not allowed, the first state of the first cell is updated to reflect that the first number of columns and the second number of rows is one.

11. The system of claim 10, wherein if the expansion of the first cell is allowed, the second cell is hidden from a display of the table.

12. The system of claim 10, wherein the expansion is allowed if the second state of the second cell indicates that the second cell spans over one column and one row.

13. The system of claim 10, wherein the expansion is not allowed if the second state of the second cell indicates that the second cell spans over more than one column or more than one row.

14. The system of claim 10, wherein the expansion is not allowed if the second state of the second cell is hidden from a display of the table before the change is received.

15. The system of claim 10, wherein the expansion is not allowed if the expansion would cause the first cell to span over a non-existent cell.

16. The system of claim 10, wherein:
   the change is a first change;
   at substantially the same time that the first change is received by the processing circuitry, another user in the collaborative document editing environment transmits a second change to the processing circuitry; and
   the second change comprises an expansion of a third cell that is adjacent to the second cell.

17. The system of claim 16, wherein if the processing circuitry accepts both the first change and the second change, the second cell has an error state.

18. The system of claim 17, wherein the processing circuitry is further configured to select one of the first change and the second change so that the second cell does not have the error state.

* * * * *